March 26, 1929. R. H. FORNEY 1,706,445

PACKING RING FOR PUMPS

Filed Nov. 26, 1926

Ross H. Forney
INVENTOR.

BY John M. Spellman
ATTORNEYS.

Patented Mar. 26, 1929.

1,706,445

UNITED STATES PATENT OFFICE.

ROSS H. FORNEY, OF DALLAS, TEXAS.

PACKING RING FOR PUMPS.

Application filed November 26, 1926. Serial No. 150,751.

This invention relates to improvements in pumps, and it refers more particularly to a packing for pumps.

Certain types of pump packing are faulty in that they become worn and burnt and require considerable adjustment from time to time. Also in some types of pump packing there is no effective means for preventing water leakage from getting into the bearings, which causes trouble on account of loss of lubrication.

One of the objects of the present invention is to produce a pump packing to eliminate the possibility of worn or burnt packing by forcing the pump packing outwardly against the casing of the pump and at the same time relieve some of the pressure off of the rotary shaft or sleeve of the pump.

Another particular object of the invention is to provide means for taking care of any water which might leak by between the rotating shaft of the pump and the packing and to prevent it from getting into the pump bearings, and also to provide a means for preventing leakage of water between the packing and the casing of the pump.

With the above and other minor yet important objects in view, the invention will be better understood from a perusal of the following detailed description taken in connection with the accompanying drawings forming part of this specification and wherein:—

Figure 1:
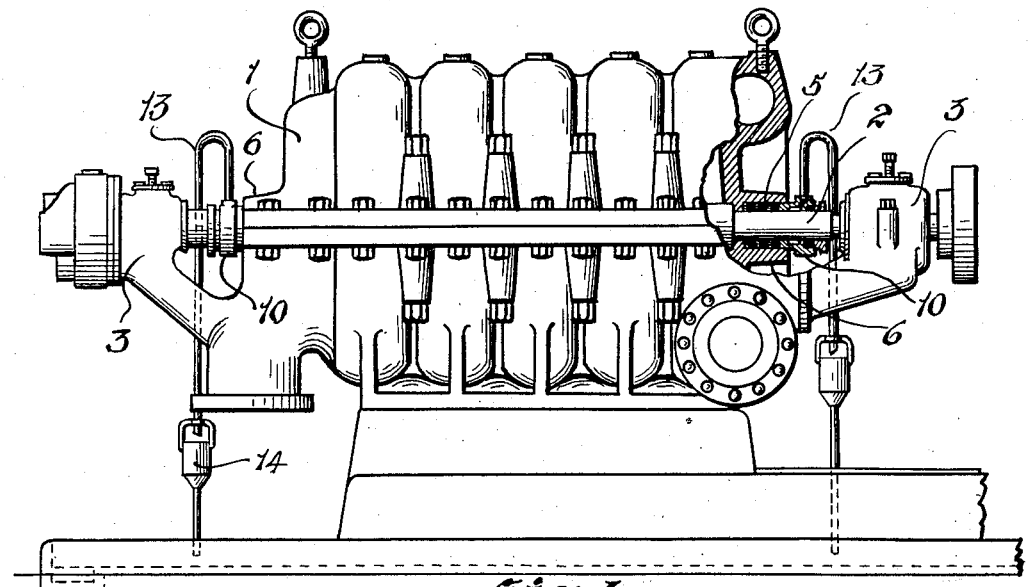
Figure 1 is a side elevational view of a pump embodying the invention, the view partly broken away.
Figure 2:
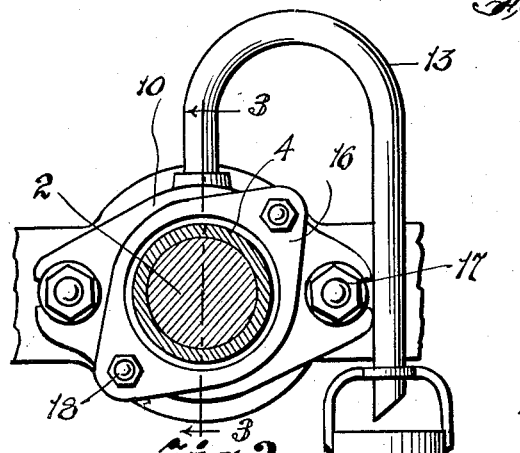
Figure 2 is a vertical sectional view taken through one end of the pump and enlarged.

Proceeding in accordance with the drawings and wherein similar reference numerals indicate the various parts, 1 denotes a pump of well known type including a rotary shaft 2 supported in the bearings 3. A sleeve 4 is interposed between the packing and the shaft 2.

Figure 3:
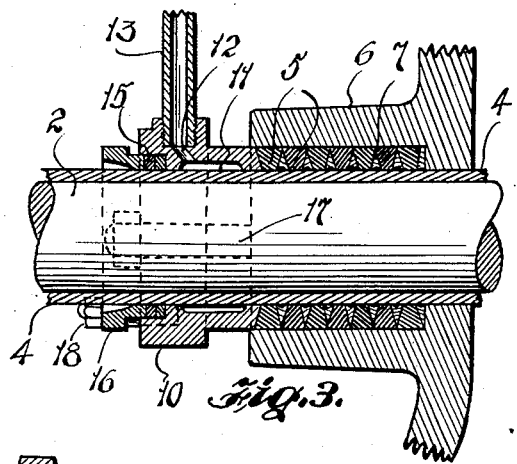
Figure 3 is a longitudinal sectional view taken on line 3—3 of Figure 2.
Figure 4:
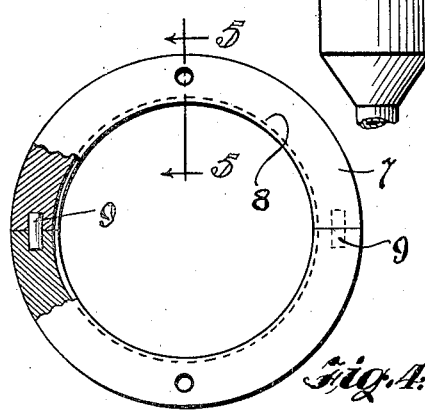
Figure 4 is an enlarged detail view of one of the rings used in conjunction with the packing.
Figure 5:
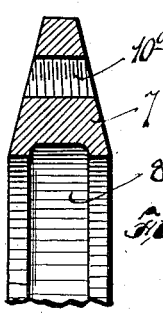
Figure 5 is a detail sectional view along line 5—5 of Figure 4 illustrating the interior construction of one of the rings.

In the present invention there is provided a packing 5. In Figure 3 this packing is clearly shown interposed between the inner side of pump casing 6 and the sleeve 4. This packing may be of any suitable material and is assembled so as to permit the insertion and reception of a plurality of rings 7. One of these rings is shown in side elevation in Figure 4 and again in partial cross-section in Figure 5. Each of these rings is of inverted V shape in cross-section and has an annular groove 8. However, the shape and size of this ring may be varied in order to give the same result. These rings can be made of bronze or any other suitable material. For convenience of assembly, the ring is divided preferably into two parts and connected by the pins 9. Each ring is also provided with openings 10$^a$ for removing the rings from the pump casing 6. These rings are for the purpose of forcing the packing material out against the casing of the pump and simultaneously relieve some of the pressure off of the rotary shaft 2 or sleeve 4. This accomplishes two objects: By forcing the packing material against the casing of the pump, caused by the shape of the rings against the packing, it prevents leakage between the packing and pump casing 6, and by relieving some of the pressure of the packing on the shaft or sleeve, it prevents burning of the packing, thereby giving longer life to the packing and requiring considerable less adjustment, ordinarily found in other types of packing. This pressure release also reduces wear on the shaft or sleeve.

In addition to the above, whatever water leaks between the packing and shaft or sleeve is caught in the annular recess 11 in the main packing gland 10 and is carried away. This main packing gland has an annular space 11 in which the water collects and passes through a duct 12 into a goose neck 13 and is finally received in the pot 14. The main packing gland 10 presses against the packing material and is provided with a secondary packing 15. Bearing against the secondary packing is a secondary packing gland 16, and bolts 17 and 18 hold the parts together.

Obviously modifications and alterations may be made in the construction of the invention in keeping with the appended claims.

What is claimed is:

1. In a packing for pumps, in combination with a pump shaft, a plurality of rigid rings of gradually decreasing cross-sectional area from their inner perimeters to their outer perimeters, said rings being mounted upon the shaft but free from engagement therewith, and soft packing mounted upon the shaft between the facing sides of the adjacent rings whereby when the packing is squeezed longitudinally the soft packing will be urged away from the shaft.

2. In a packing for pumps, a casing for the packing, a pump shaft, a plurality of rigid packing rings mounted on the shaft, said rings being of gradually decreasing cross-sectional area from their inner perimeters to their outer perimeters, and soft packing mounted upon the shaft between the facing sides of the adjacent rings, whereby, when the packing is squeezed longitudinally the soft packing will be urged away from the shaft and into engagement with the casing by the inclined faces of the rigid packing rings.

In testimony whereof I affix my signature.

ROSS H. FORNEY.